L. J. BOSWORTH.
SEED-PLANTER.

No. 183,835. Patented Oct. 31, 1876.

WITNESSES:
Chas. Nida
John Goethals

INVENTOR:
L. J. Bosworth
BY
ATTORNEYS.

UNITED STATES PATENT OFFICE.

LYCURGUS J. BOSWORTH, OF MONMOUTH, ILLINOIS.

IMPROVEMENT IN SEED-PLANTERS.

Specification forming part of Letters Patent No. 183,835, dated October 31, 1876; application filed April 4, 1876.

*To all whom it may concern:*

Figure 1:
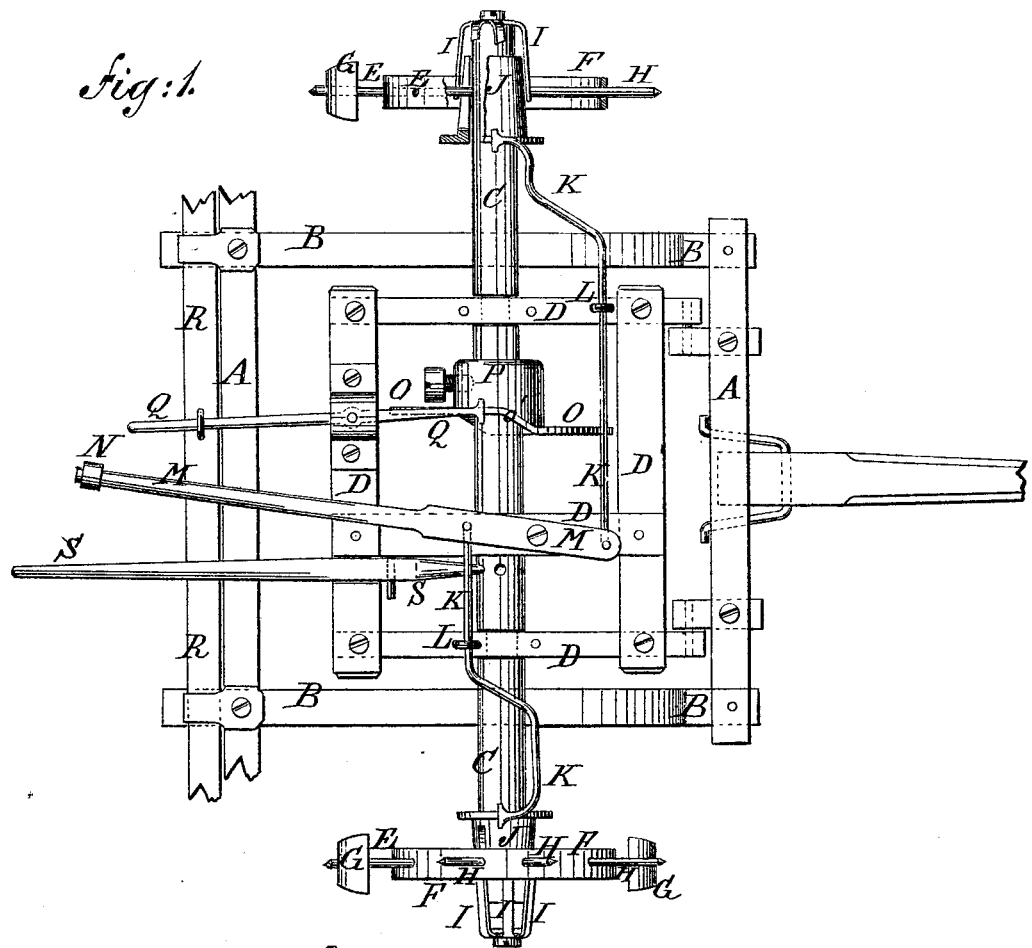
Figure 2:
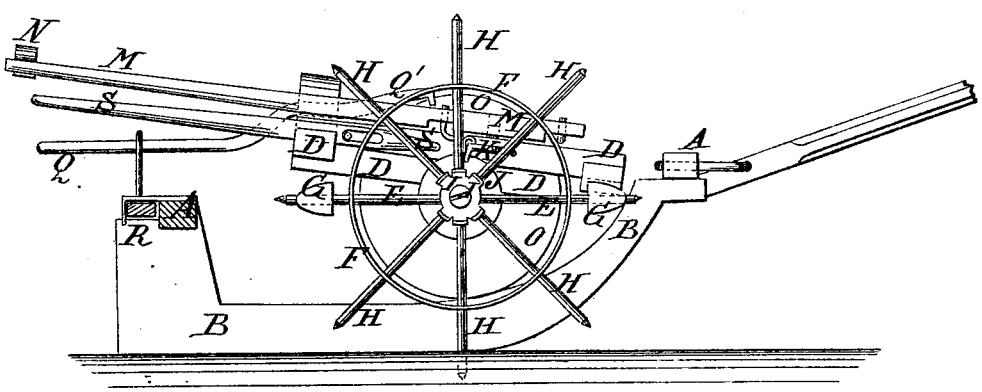

Be it known that I, LYCURGUS J. BOSWORTH, of Monmouth, in the county of Warren and State of Illinois, have invented a new and useful Improvement in Check-Row Seed-Planter, of which the following is a specification:

Figure 1 is a top view of my improved device shown as applied to the frame of a seed-planter, part being broken away to show the construction. Fig. 2 is a side view of the same.

Similar letters of reference indicate corresponding parts.

The object of this invention is to furnish an improved device for attachment to seed-planters to enable the seed to be planted in check-row, and which shall be simple in construction, convenient in use, and reliable in operation.

A represents the frame of a seed-planter, to which are attached the runners B, by which the furrows are opened to receive the seed. C is a long axle, which revolves in bearings attached to the small frame D. The forward ends of the side bars of the frame D are hinged to the front cross-bar of the frame A. To the opposite sides of each end of the axle B are attached two spokes, E, which pass through and are secured to the opposite sides of a rim, F, and to which, near their outer ends, are attached blocks G, to mark the ground opposite the hills. H are spokes, which are placed equally distant from each other and from the spokes E, and which pass through and work in holes in the rims F. The inner ends of the spokes H are attached to or formed solid with the inner ends of the spring-bars I, the outer ends of which are secured to the ends of the axle C, and which are so formed as to hold the inner ends of the spokes H pressed against the said axle C. Upon the end parts of the axle C, at the inner sides of the spokes E H, are placed conical thimbles J, with their smaller ends outward, and which are slotted from their outer ends to receive the spokes E.

By this construction, by moving the thimbles J outward or inward, the spokes H may be made to project more or less to cause the wheels to measure off more or less ground at each revolution, and plant the hills at a greater or less distance apart, as may be desired.

Upon the inner ends of the thimbles J are formed flanges, upon which ride the forked outer ends of the connecting-rods K. The rods K pass through keepers L, attached to the side bars of the frame D, and their inner ends are pivoted to the lever M upon the opposite sides of and equally distant from its pivoting-point. The lever M is pivoted to a bar of the frame D, and to its rear end is attached a stirrup or loop, N, to enable it to be operated by the driver with his foot.

O is a circular disk, in the opposite sides of which are formed two inclined offsets, $o'$, so that the halves of the disk may be parallel with each other, but in different planes. The disk O is attached to a collar, P, placed upon the shaft C, and secured to it by a set-screw or other convenient means. Upon the edge of the disk O rides the forked end of a lever, Q, which is pivoted to the frame D, or to a keeper or standard attached to said frame. The rear part of the lever Q passes through a high staple or keeper attached to the dropping-slide R, by which the seed is taken from the hoppers and dropped to the ground, so that the said slide may be operated by the revolution of the axle C.

The spoke-wheels may be turned to bring them into position to drop the seed in line with the hills previously planted by means of a lever, S, the forward end of which engages with teeth formed upon or attached to, or with holes formed in, the axle C. The lever S has a short slot formed in it to receive a pin attached to the side of a bar of the frame D, so that it may be slid longitudinally to throw it into and out of gear.

When operating the lever S, the spoke-wheels must be raised from the ground.

Having thus described my invention, I claim as new and desire to secure by Letters Patent—

The expansion spoke-wheels, formed of the stationary spokes E, provided with the marking-blocks G, the rims F, the spokes and spring-bars H I, the slotted conical thimbles J, and the rods K, and the lever M, provided with the stirrup N, in combination with the axle C and the frame D of a seed-planter, substantially as herein shown and described.

LYCURGUS J. BOSWORTH.

Witnesses:
FRANCIS B. KENDALL,
DAVID S. HAYDEN.